(No Model.)
E. C. PRICE.
CHILD'S CARRIAGE.
No. 248,610. Patented Oct. 25, 1881.
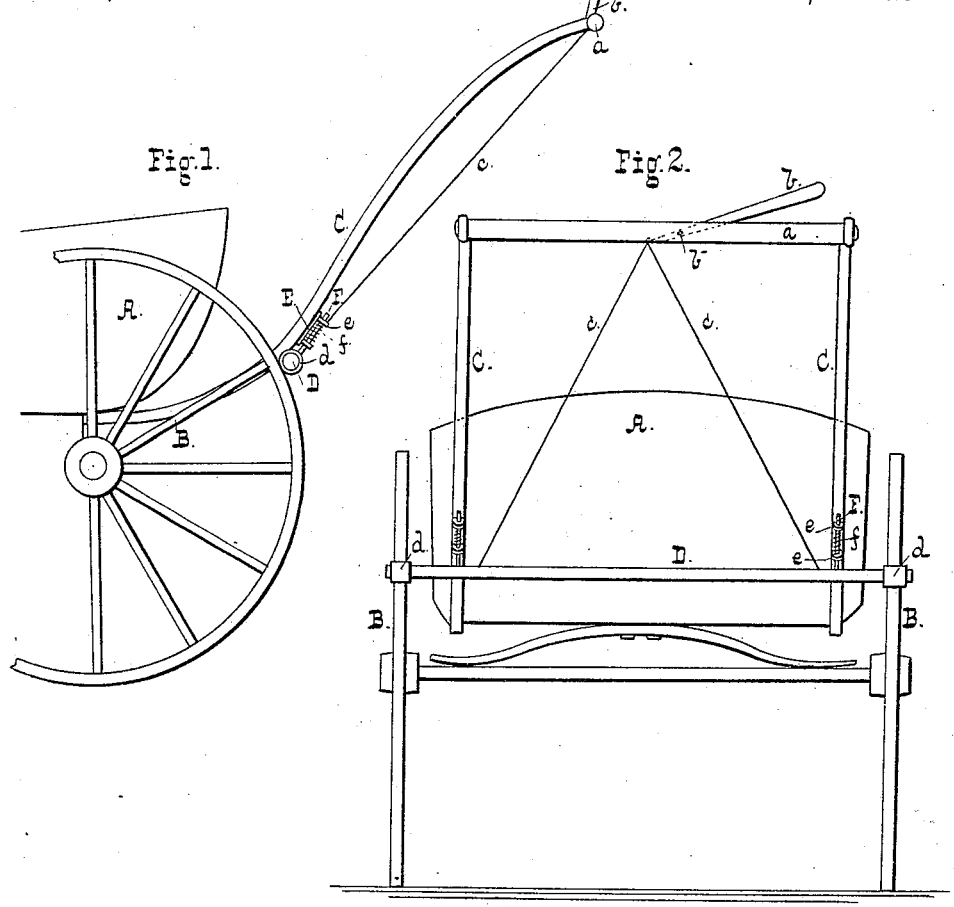
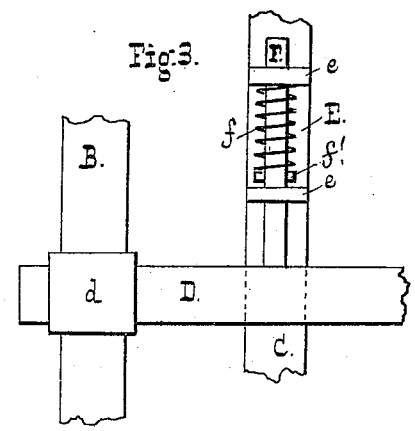
WITNESSES.
G. A. Graham.
J. N. Pistel.
INVENTOR
E. C. Price.
BY
R. W. Williams,
ATTORNEY.

United States Patent Office.

ELDRIDGE C. PRICE, OF BALTIMORE, MARYLAND.

CHILD'S CARRIAGE.

SPECIFICATION forming part of Letters Patent No. 248,610, dated October 25, 1881.

Application filed August 22, 1881. (No model.)

*To all whom it may concern:*

Be it known that I, ELDRIDGE C. PRICE, of Baltimore city, State of Maryland, have invented certain new and useful Improvements in Children's Carriages; and I hereby declare the same to be fully, clearly, and exactly described as follows, reference being had to the accompanying drawings, in which—

Figure 1 is a side elevation of the rear end of the carriage. Fig. 2 is an elevation of the same; and Fig. 3 is a similar view, on an enlarged scale, of the brake.

My invention relates to children's carriages or perambulators, and has especial reference to a mechanism designed to lock the wheels during the absence from the carriage of its attendant, but so arranged as to release the wheels when the carriage is pushed forward.

Many accidents have occurred to the infant and helpless occupants of children's carriages, due to the liability of the carriage to descend the grade of the pavement and into the gutter in case of inattention of the nurse in releasing the handle.

It is the object of my invention to obviate this source of danger by applying to the carriage a brake mechanism which is active as a brake the moment the hands of the attendant are released from the push-bar, and releases the wheels as the carriage is set in motion.

In the drawings, A is the carriage-body, and B the wheels.

C C are the rear standards, connected by a push-bar, a, as usual. To the standards C are attached plates E, having ears or lugs e e, through which pass rods F, attached to the brake-bar D. A pin, f', passes through each rod F, and between it and the upper ear e a spring, f, is coiled about the rod.

On the ends of the brake-bar, and opposite the peripheries of the wheels, are sprung the brake-shoes d, consisting of sections of ordinary rubber hose or tubing. A pair of wires, c, connects the ends of the bar D with the short arm of a lever, b, which is pivoted at b' to the push-bar a.

From the foregoing description of the device it will be seen that the shoes d are normally thrust down, by means of the springs f, into contact with the peripheries of the wheels. The natural movement of the attendant, in placing the hands upon the push-bar, raises the brake-bar and releases the wheels. The moment the lever b is released the springs f again thrust the brake-shoes against the wheels and prevent their rotation.

What I claim is—

1. In combination with the brake-bar and springs for locking the wheels, the lever b, attached to the push-bar and adapted to release the brakes, as set forth.

2. In combination with the brake-bar having the rubber bands upon its ends, the springs f, wires c, and lever b, as set forth.

3. In combination with the plates E, secured to the standards and having the ears e, the bar D, rods F, springs f, wires c, and lever b, as set forth.

ELDRIDGE C. PRICE.

Witnesses:
R. D. WILLIAMS,
GEO. H. RISTEL.